United States Patent [19]

Meister

[11] Patent Number: 5,121,801
[45] Date of Patent: Jun. 16, 1992

[54] SOLUBLE FOR CROSSLINKED GRAFT COPOLYMERS OF LIGNIN BASED ON HYDROXYETHYLMETHACRYLATE AND ACRYLAMIDE

[76] Inventor: John J. Meister, 31675 Westlady Rd., Beverly Hills, Mich. 48010-5624

[21] Appl. No.: 408,742

[22] Filed: Sep. 18, 1989

Related U.S. Application Data

[62] Division of Ser. No. 287,000, Dec. 20, 1988, Pat. No. 4,889,902.

[51] Int. Cl.⁵ .............................................. E21B 43/00
[52] U.S. Cl. ................................... 166/309; 527/400; 524/799; 166/268
[58] Field of Search ........................ 527/400; 524/799; 166/309

[56] References Cited

U.S. PATENT DOCUMENTS

| | | | |
|---|---|---|---|
| 4,374,738 | 2/1983 | Kelley | 524/445 |
| 4,687,828 | 8/1987 | Meister et al. | 527/400 |
| 4,889,902 | 12/1989 | Meister | 527/400 |

*Primary Examiner*—John C. Bleutge
*Assistant Examiner*—Frederick Krass
*Attorney, Agent, or Firm*—Barnes, Kisselle, Raisch, Choate, Whittemore & Hulbert

[57] ABSTRACT

A soluble or crosslinked graft copolymer of lignin-(2-propenamide)-(2-methyl-3-oxo-4-oxyhex-1-ene-6-ol) having a central lignin network and at least one grafted side chain, R, having randomly repeating units of the formula:

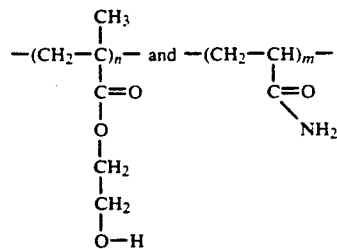

such that the central lignin network has a molecular weight of about 1,000 to 150,000 and the total number of randomly repeating units in the grafted side chain or chains is in the range of 1 to 300,000, such that the total copolymer molecular weight is in the range of 1,000 to 30,000,000 for use as thickeners for water and aqueous solutions and may be advantageously used in the recovery of oil from subterranean wells, in the preparation and use of drilling fluid compositions, or in plastics and elastomers.

1 Claim, No Drawings

SOLUBLE FOR CROSSLINKED GRAFT COPOLYMERS OF LIGNIN BASED ON HYDROXYETHYLMETHACRYLATE AND ACRYLAMIDE

REFERENCE TO CO-PENDING APPLICATION

This is a divisional application of co-pending U.S. patent application Ser. No. 07/287,000 filed on Dec. 20, 1988 now U.S. Pat. No. 4,889,902.

FIELD OF INVENTION

The present invention relates to soluble or crosslinked graft copolymers of lignin-(2-propenamide)-(2-methyl-3-oxo-4-oxyhex-1-ene-6-ol), methods of making the same and uses therefor.

BACKGROUND OF THE INVENTION

Aqueous solutions which flow at a controlled rate under a given shear stress are required throughout a variety of industrial applications. Such control of viscosity of water is achieved by adding to water agents such as clays, large amounts of polar organic compounds such as polyacrylates or high concentrations of salts. With the appropriate additives, these aqueous solutions can suspend large amounts of a solid phase and form a thermodynamically stable mixture. These aqueous solutions suspend finely divided solids and will flow slowly when exposed to shear stress. Such solutions, free of solids, also flow more uniformly in situations where numerous paths providing different resistances to flow are open to the fluids. There are, however, numerous applications for polymers in the dry state. Most water soluble polymers are not useful as plastic solids or in the dry state. This invention is directed to materials that are so useful.

Each of the conventional agents mentioned above as useful in controlling fluid flow has attendant disadvantages, particularly when used to recover oil from subterranean wells. Hence, a need continues to exist for new agents which are capable of suitably thickening water and aqueous solutions having the desirable properties outlined below but which are free of attendant disadvantages. Further, many materials are used to make objects of manufacture with functional strength and resistance properties. These materials are usually not, however, polymers which can be dissolved in water. Further, most of these objects are made from expensive synthetic chemicals rather than cheaper natural compounds like lignin. Objects of manufacture which contain large amounts of lignin are desirable, inexpensive products because of low raw materials cost.

SUMMARY OF THE INVENTION

A soluble or crosslinked graft copolymer of lignin-(2-propenamide)-(2-methyl-3-oxo-4-oxyhex-1-ene-6-ol) having a central lignin network and at least one grafted side chain, R, having randomly repeating units of the formulas:

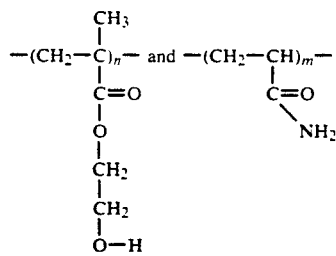

such that the central lignin network has a molecular weight of about 1,000 to 150,000 and the total number of random units in the grafted side chain or chains is in the range of 1 to 300,000 units, such that the total copolymer molecular weight is in the range of 1,000 to 30,000,000.

Objects, features and advantages of the present invention are to provide an uncharged lignin graft copolymer; provide simplistic and reliable processes for preparing such lignin graft copolymer; provide a method for using an uncharged lignin graft copolymer in preparing highly viscous, water-based foams or foams which are particularly useful in oil recovery from subterranean wells; provide a method of boosting or enhancing polymer molecular weights during polymerization reactions; provide inexpensive plastics and articles of manufacture from lignin; and to provide gels of lignin for use as membranes, immobilizing fluids or solids, and absorbing fluids.

DETAILED DESCRIPTION OF THE PREFERRED EMBODIMENTS

In accordance with the present invention, there is provided a high molecular weight graft copolymer containing lignin as the backbone network and poly((1-amidoethylene)-co-(1-methyl-1-(1-oxo-2-oxybut-4-ol-1-yl)ethylene)) as the grafted side chain.

Lignin is derived from woody plants. In fact, after cellulose, it is the principal constituent of the woody structure of higher plants. Lignin, which makes up about 25% of the weight of dry wood, acts as a cementing agent to bind the matrix of cellulose fibers together into a rigid woody structure. See *Biochemistry* by A. L. Lehninger (Worth Publishers, 1970).

Moreover, lignin sources are abundant. Although the wood and bark waste from the lumber industry and wastes from agricultural operations could provide extremely large quantities of lignin, perhaps the most accessible, albeit smaller, source is the pulp and paper industry. For example, for 1978, it has been estimated that the U.S. chemical-pulp industry produced $1.55 \times 10^7$ metric tons of alkali lignin and $1.6 \times 10^6$ tons of lignosulfonic acids. See *Encyclopedia of Chemical Technology*, vol. 14 (Kirk-Othmer, 1981).

In general, the molecular structure of the repeating lignin units and the appropriate numbering thereof is as follows:

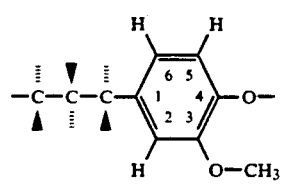

Lignin, regardless of origin, in general, is a complex oxyphenylpropene polymer. In the natural state, lignin is a highly branched and partially crosslinked polymer. However, there appears to be some structural variation in branching depending upon whether the lignin is derived from coniferous or deciduous species or from bark, cambium, sapwood or heartwood. During recovery, the lignin is chemically altered and is available in relatively pure form as a derivative having a molecular weight of about 1,000 to 150,000. Suitable lignins which may be used according to the present invention are alkali lignins, HCl lignins, milled wood lignins (MWL) and 1,4-dioxane lignins, for example.

Alkali lignins are used in the examples of this application. However, reactions can be run on solvent-extracted lignin, kraft lignin, pine lignin, aspen lignin and steam-exploded lignin. Alkali lignins are tan, brown or black powders. When free of metal cations such as sodium or potassium, alkali lignins are water-soluble materials and are commonly called "free acid" or "acid free" lignin. When containing metal cations, such as sodium or potassium, the alkali lignins are slightly water soluble materials which increase in water solubility as the pH increases from 7 toward 14 and become completely soluble in 5 wt% aqueous sodium hydroxide solutions. Alkali lignins have, as a basic repeating unit, the oxyphenylpropyl unit:

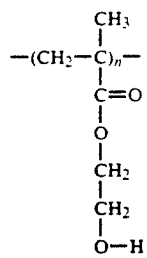

The aromatic ring is often alkoxy substituted, as shown, and the propene group often has a hydroxyl group attached in place of one hydrogen. Alkyl groups appear on some of the aromatic groups of the polymer and sulfur may be chemically bound to parts of the polymer, though few, if any, sulfonate groups occur.

Bonding between repeat units in alkali lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form alkali lignin salts. Alkali lignins are readily identified by method of production and are a familiar class of compounds to those versed in the paper making art.

In accordance with the present invention, to the lignin macromolecule, to the aromatic ring to the 2, 5 and/or 6 positions, and/or to the alkyl chain carbon atoms at the 1, 2 and/or 3 positions of the oxyphenylpropene moiety, is grafted repeating units of 1-amidoethylene:

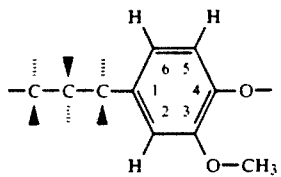

in combination with repeating units of 1-methyl-1-(1-oxo-2-oxybut-4-ol-1-yl)ethylene:

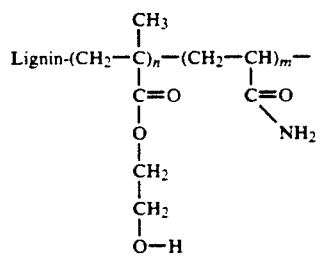

For example, when using alkali lingins in accordance with the present invention, a lignin graft copolymer of the following formula is produced:

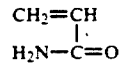

In this structural formula, the subscripts m and n are used to show that large numbers of these repeat units can be attached to the lignin backbone but the formula does not mean that these repeat units occur in strings of one type followed by strings of another type. Usually, the graft copolymers formed have random copolymer side chains with the two repeat units occurring in random sequence in the chain.

The preparation of this copolymer is accomplished, in general, under oxygen-free conditions by adding a redox initiator; a chloride salt; 2-propenamide,

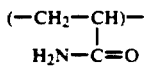

and 2-methyl-3-oxo-4-oxyhex-1-ene-6-ol,

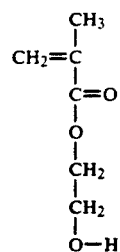

to a lignin dispersion in a suitable solvent and allowing time for graft polymerization to occur.

Preparation of alkali lignin-(2-propenamide)-(2-methyl-3-oxo-4-oxyhex-1-ene-6-ol) graft copolymer in dimethylsulfoxide, $(CH_3)_2SO$, will now be illustrated for a sample composed of between 0.32 and 3.0 weight percent lignin, 0.2 and 7.6 weight percent 2-propenamide, 0.2 and 7.9 weight percent 2-methyl-3-oxo-4-oxyhex-1-ene-6-ol, 0.6 to 15.3 weight percent calcium chloride, 0.0 to 6.1 weight percent aqueous solution of cerium (+IV), and 60 to 97 weight percent solvent.

Significant variation in reaction mixture composition is possible as will be illustrated in the examples to follow. However, there is a generic way to prepare the graft copolymer. This method will now be described, generally.

As a suitable solvent for the graft copolymerization of the present invention, it should be noted that, in general, organic solvents are used and, of these, the polar, aprotic solvents are preferred. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use 50/50 (vol/vol) mixtures of one of the above solvents, such as DMSO, with water.

An aliquot of 20 mL of purified solvent is placed in a 125 mL conical flask. Lignin and finely ground anhydrous calcium chloride are added to the pure solvent and the mixture is stirred for about 20 minutes while being bubbled with nitrogen. After 10 minutes of nitrogen saturation, a hydroperoxide such as hydrogen peroxide, 1,2-dioxy-3,3-dimethylbutane or 2-hydroperoxy-1,4-dioxycyclohexane is added to the reaction mixture. This addition can be made by adding an aqueous solution of the peroxide for safe handling or the peroxide can be added directly. Solid 2-propenamide (Monomer I) and a nitrogen-saturated solution of 2-methyl-3-oxo-4-oxyhex-1-ene-6-ol (Monomer II) in solvent are added while nitrogen gas is bubbled into the mixture. After about 10 minutes, a sufficient volume of 0.05M ceric sulfate in water may be added, the flask is sealed under nitrogen, and the slurry is stirred for 10 more minutes. The reaction starts immediately. The flask contents will often thicken slowly but may even solidify into a precipitate-laden, viscous slurry.

The reaction flask is placed in a 30° C. bath and allowed to sit for two days. The reaction is then terminated with 0.5 mL of 1 wt% of hydroquinone in water. The reaction mixture is diluted with 100 mL of water and stirred until a uniform reaction product is precipitated by adding the dilute reaction mixture dropwise to 1 liter of 2-propanone or other suitable nonsolvent for the graft copolymer. The solid is recovered from 2-propanone by filtration and dried under vacuum at 40° C. To obtain a higher purity product which is more readily soluble, the reaction product is recovered from nonsolvent by filtration and redissolved in water. The aqueous solution is dialyzed against pure water using a 3,500-upper-molecular-weight-permeable, dialysis membrane for several days. The aqueous solution containing the solid is then freeze-dried. For a crosslinked product, the recovery process is to dialize the product against water to remove the reaction solvent and then freeze dry the product.

It is preferred that all reagents used be of reagent grade purity but less pure materials may be used if they do not contain inhibitors for the reaction. Other concentrations of cerium (+IV) ion solution in other nonreactive solvents can be used to add this reagent to the reaction and, indeed, this reagent is not necessary for the reaction. The 0.05M cerium (+IV) sulfate solution is stable and convenient to use, however. The concentration of the ceric sulfate solution used can vary from about 0.01M to 0.3M. Other reagents that may be used in place of ceric ion ($Ce^{4+}$) include vanadium ($V^{+5}$) or manganese ions ($Mn3+$, $Mn4+$, $Mn7+$) It is preferred that the metal salt be added as an aqueous solution. The reaction can be run without adding cerium or other oxidizing metal ions but slightly higher yields and better solubility properties are obtained when the oxidizing metal ion is added. The graft copolymer can and will be produced if this reagent is not added to the synthesis mixture but product properties are improved by the addition of cerium (+4) solution. Other changes in this procedure, evident to those skilled in synthesis or chemical manufacture can be made. The graft copolymer can also be produced by adding nitrogensaturated 2-propenamide to the reaction mixture in another solvent.

Other hydroperoxides, such as inorganic hydroperoxides may be used in place of the hydrogen peroxide listed above. The graft copolymerization reaction can be conducted with or without stirring once the monomer and metal salt have been dispersed in the reaction mixture. The reaction is allowed to proceed for 1 to 200 hours, with 48 hours being a typical reaction time. It is preferred to terminate the copolymerization by addition of a free radical scavenger such as hydroquinone.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed. The reaction mixture is added to 2-20, preferably 5-10, times its volume of a nonsolvent for the polymer, such as 2-propanone. Preferably the nonsolvent is stirred vigorously so as to form a vortex and the copolymer solution is slowly drained directly into the center of this vortex. The precipitated graft copolymer is then removed from the nonsolvent solution by filtration, washed with nonsolvent, filtered, and vacuum-dried to a constant weight. A purer product can be obtained by the dialysis-freeze drying process described above. If the reaction product is crosslinked, the product is dried to form a solid block of polymer.

The following examples illustrate certain embodiments of this invention wherein parts and percentages are by weight and temperatures are in centigrade unless otherwise indicated. Indulin AT, a commercial lignin product of the Westvaco Corporation Chemicals Division, P.O. Box 5207, North Charleston, S.C. 29406 and Eastman reagent-grade 2-propenamide were used in these syntheses. BM-903, 2-methyl-3-oxo-4-oxyhex-1-ene-6-ol, was obtained from Rohm Tech, Inc., 195 Canal Street, Malden, Mass. 02148 as a sample of lot number 174291 and was purified by distillation from over KOH before use. A typical distillation was done at 1.3 pascals nitrogen pressure with a pot charge of 100 g of monomer, as received, and 0.029 g of KOH with monomer distilled at 50° C. Dimethyl sulfoxide, of reagent grade, from Mallinckrodt Chemical Co. and anhydrous calcium chloride also therefrom were used in these examples. Ceric sulfate solution was prepared from reagent grade ceric sulfate and distilled water. The hydroquinone solution was 1 wt% hydroquinone in distilled water.

The limiting viscosity number of the product in pure water was determined using the Fuoss equation (a) to extrapolate several viscosity measurements to zero polymer concentration.

$$C/\eta_{sp} = 1/[\eta] + Q_f C^{\frac{1}{2}} \tag{a}$$

Here $\eta_{sp} = (\eta - \eta_o)/\eta_0$, C) C is polymer concentration in g/dL, Q/ is a fitting constant, and $[\eta]$ is limiting viscosity number. See *J. Poly. Sci.*, 3,603–604 (1948).

The present invention will now be further illustrated by certain examples and references which are provided for purposes of illustration and are not intended to limit the present invention.

Yield was calculated from the formula: (g = grams)

$$\text{weight percent yield} = \frac{(\text{g polymer recovered})}{\text{g lingin added} + \text{g monomer added}}$$

EXAMPLES

Example 1

A total of 0.5 g of lignin and 0.5 g of calcium chloride were placed in a 125 mL erlenmeyer flask containing 12 mL of dimethylsulfoxide. The mixture was stir-bubbled with nitrogen (N2) for about 10 minutes before 0.85 mL of hydrogen peroxide solution (30% by weight), was added to the reaction mixture. N2 was bubbled through the reaction mixture for about 5 minutes, while 1.00 g of 2-propenamide (I) in 5. mL of dimethylsulfoxide which had been saturated with N2 for 10 minutes was then added. After about 2 minutes of stirring and N2 bubbling, 3.32 g of 2-propenamide (I) and 0.87 g of 2-methyl-3-oxo-4-oxyhex-1-ene-6-ol (II) in 10.0 mL of dimethylsulfoxide were added. This solution had been saturated with N2 for 10 minutes before addition to the reaction mixture. After about 5 minutes of stirring and bubbling N2 through the reaction mixture, the flask was sealed and placed in a 30° C. bath for 2 days. The mole ratio of monomer I to II in the reaction solution was 9 to 1. The molecular weight of monomer I used was 71.08 g and that of monomer II was 130.1 g. The reaction was then terminated by adding 0.1 g of 1% hydroquinone and 100 mL of water thereto. The stirred reaction mixture was precipitated in 1L of 2-propanone and recovered by filtration. The recovered solid was dissolved in 100 mL of water and dialyzed against water for 3 days. The dilute reaction product in the dialysis tube was recovered by freeze drying and found to weigh 5.10 g. The product was labeled 19-95-1. Yield = 89.63 wt%. The product of this example had a lignin content of 4.62 wt% and a nitrogen content of 15.21 wt%.

Example 2

A total of 3.01 g of I and 2.04 g of II was placed in a 10 mL of dimethylsulfoxide and stirred until dissolved. This solution was labeled 19-92-B. A sample labeled 19-92-C was prepared by mixing 1.01 g of monomer I with 5.5 mL of dimethylsulfoxide and was saturated with N2 for 10 minutes. A total of 0.5 g of lignin and 0.5 g of calcium chloride were placed in a 125 mL erlenmeyer flask containing 12 mL of dimethylsulfoxide, dissolved, and labeled 19-92-A. The mixture (92-A) was stir-bubbled with nitrogen (N2) for about 10 minutes before 0.85 mL of hydrogen peroxide solution (30% by weight), was added to the reaction mixture. N2 was bubbled through the reaction mixture for about 5 more minutes before 92-C was added to the mixture (92-A) and, 1 minute later, 92-B was then added. After about 5 minutes of stirring and bubbling N2 through the reaction mixture, the flask was sealed and placed in a 30° C. bath for 2 days. The mole ratio of monomer I to II in the reaction solution was 78.3 to 21.7 or about 4 to 1. The reaction was then terminated by adding 0.1 g of 1% hydroquinone and 100 mL of water thereto. The stirred reaction mixture was precipitated in 1L of 2-propanone and recovered by filtration. The recovered solid was dissolved in 100 mL of water and dialyzed against water for 3 days. The dilute reaction product in the dialysis tube was recovered by freeze drying and found to weigh 3.79 g. Yield = 60.4 wt%. The product was labeled 19-92-3. The product of this example had a lignin content of 10.47 wt%, a nitrogen content of 15.37 wt%.

EXAMPLE 3

A total of 0.5 g of lignin and 0.5 g of calcium chloride were placed in a 125 mL erlenmeyer flask containing 12 mL of dimethylsulfoxide. The mixture was stir-bubbled with nitrogen (N2) for about 10 minutes before 0.85 mL of hydrogen peroxide solution (30% by weight), were added to the reaction mixture. N2 was bubbled through the reaction mixture for about 5 more minutes, while 0.75 9 of 2-propenamide (I) in 5.5 mL of dimethylsulfoxide which had been saturated with N2 for 10 minutes was then added. After about 2 minutes of stirring and N2 bubbling, 1.752 g of 2-propenamide (I) and 2.686 g of 2-methyl-3-oxo-4-oxyhex-1-ene-6-ol (II) in 10.0 mL of dimethylsulfoxide were added. This solution had been saturated with N2 for 10 minutes before addition to the reaction mixture. After about 5 minutes of stirring and bubbling N2 through the reaction mixture, the flask was sealed and placed in a 30° C. bath for 2 days. The mole ratio of monomer I to II in the reaction solution was 63 to 37. The reaction was then terminated by adding 0.1 g of 1% hydroquinone and 100 mL of water thereto. The reaction mixture was spun in a Sowall RC2-B centrifuge for 33 minutes at 7000 rpm. The supernate was poured off from the sediment from this centrifugation and the two sample parts were labeled: supernate = aqueous and sediment = organic. The recovered aqueous phase was diluted with 100 mL of water and dialyzed against water for 3 days. The recovered organic phase was suspended in 100 mL of water and dialyzed against water for 3 days. The dilute reaction product in the dialysis tubes was recovered by freeze drying and found to weigh aqueous = 2.73 g and organic = 1.49 g. Total yield is 5.69 g. The product was labeled 19-96-1. Yield = 74.2 wt%. The product of this example had a lignin content of 17.94 wt% and a nitrogen content of 4.84 wt%.

Example 4

A total of 0.5 g of lignin and 0.5 g of calcium chloride were placed in a 125 mL erlenmeyer flask containing 12 mL of dimethylsulfoxide. The mixture was stir-bubbled with nitrogen (N2) for about 10 minutes before 0.85 mL of hydrogen peroxide solution (30% by weight), were added to the reaction mixture. N2 was bubbled through the reaction mixture for about 5 more minutes, while 0.65 g of 2-propenamide (I) in 5.5 mL of dimethylsulfoxide which had been saturated with N2 for 10 minutes was then added. After about 2 minutes of stirring and N2 bubbling, 1.184 g of 2-propenamide (I) and 3.357 g of 2-methyl-3-oxo-4-oxyhex-1-ene-6-ol (II) in 10.0 mL of dimethylsulfoxide were added. This solution had been saturated with N2 for 10 minutes before addition to the reaction mixture. After about 5 minutes of stirring and bubbling N2 through the reaction mixture, the flask was sealed and placed in a 30° C. bath for 2 days. The mole ratio of monomer I to II in the reaction solution was 1 to 1. The reaction was then terminated by adding 0.1 g of 1% hydroquinone and 100 mL of water thereto. The reaction mixture was spun in a Sowall RC2-B centrifuge for 33 minutes at 7000 rpm. The supernate was poured off from the sediment from this centrifugation and the two sample parts were labeled: supernate=aqueous and sediment=organic. The recovered aqueous phase was diluted in 100 mL of water and dialyzed against water for 3 days. The recovered organic phase was suspended in 100 mL of water and dialyzed against water for 3 days. The dilute reaction product in the dialysis tubes was recovered by freeze drying and found to weigh aqueous =2.14 g and organic =2.09 g. Total yield is 5.75 g. The product was labeled 19-96-3. Yield =73.6 wt%. The product of this example had a lignin content of 6.67 wt% and a nitrogen content of 6.22 wt%.

Note that examples 1 to 4 show that this product can be made in yields above 60 weight percent and with mole ratios of amide monomer to hydroxyl containing monomer of from 1 to 1 up to 9 to 1.

EXAMPLE 5

A total of 0.51 g of lignin and 0.50 g of calcium chloride were placed in a 125 mL erlenmeyer flask containing 12 mL of dimethylsulfoxide. The mixture was stir-bubbled with nitrogen ($N_2$) for about 10 minutes before 0.85 mL of hydrogen peroxide solution (30% by weight), was added to the reaction mixture. $N_2$ was bubbled through the reaction mixture for about 5 more minutes, while 0.33 g of 2-propenamide (I) in 5.5 mL of dimethylsulfoxide which had been saturated with $N_2$ for 10 minutes was then added. After about 2 minutes of stirring and $N_2$ bubbling, 0.66 g of 2-propenamide (I) and 4.20 g of 2-methyl-3-oxo-4-oxyhex-1-ene-6-ol (II) in 10.0 mL of dimethylsulfoxide were added. This solution had been saturated with $N_2$ for 10 minutes before addition to the reaction mixture. After about 5 minutes of stirring and bubbling $N_2$ through the reaction mixture, the flask was sealed and placed in a 30° C. bath for 2 days. The mole ratio of monomer I to II in the reaction solution was 3 to 7. The reaction was then terminated by adding 1.0 g of 1% hydroquinone and 100 mL of water thereto. The reaction product was a uniform, homogenous mass which did not dissolve in 100 mL of water that was added to the flask. The reaction product was mixed using a magnetic stirrer. After 9 days, the reaction product was still a uniform, gellotinous mass distinct from the water added when the reaction was terminated. The banging of the magnetic stir bar on the side of the flask broke the side of the flask and the 100 mL of wash water was lost. The gel product was collected and tested for solubility in various solvents. The product was labeled 19-100-1. Yield was not determined because the pure polymer product was never isolated. The product of this example had a nitrogen content of 1.41 wt%.

TABLE 1

| Solubility of Product 19-100-1 in Various Solvents | | | |
|---|---|---|---|
| Solvent | Solubility | δ | Observations* |
| ortho-xylene | insoluble | 18 | No Change |
| Tetrahydrofurane | insoluble | 18.6 | No Change |
| 2-propanol | insoluble | 20.3 | No Change |
| acrylonitrile | insoluble | 21.5 | No Change |
| pyridine | insoluble | 21.9 | Much Swelling and Sample Distention |
| 1-methyl-2-pyrolidine | insoluble | 23.1 | Much Swelling and Sample Distention |
| dimethylformamide | insoluble | 24.8 | Much Swelling and |

TABLE 1-continued

| Solubility of Product 19-100-1 in Various Solvents | | | |
|---|---|---|---|
| Solvent | Solubility | δ | Observations* |
| | | | Sample Distention |
| ethanol | insoluble | 26 | No Change |
| 1,2-dihydroxyethane | insoluble | 29 | Much Swelling and Sample Distention |

*These observations describe the sample after it sat in the solvent for 48 hours.

The cohesive energy density data, δ, show that solvents with δ=21 to 25 $(J/cm^3)^{\frac{1}{2}}$ are very effective in swelling these materials. However, the fact that these solvents did not dissolve the sample shows that the product is crosslinked. These lignin graft elastomers occur when the monomer I to monomer II ratio exceeds 1 to 1. Note that this reaction procedure produces a copolymer that has a much higher molecular weight than that produced with higher mole ratios of I to II (I=∞).

Example 6

A total of 0.50 g of lignin and 0.50 g of calcium chloride were placed in a 125 mL erlenmeyer flask containing 12 mL of dimethylsulfoxide. The mixture was stir-bubbled with nitrogen ($N_2$) for about 10 minutes before 0.85 mL of hydrogen peroxide solution (30% by weight), were added to the reaction mixture. $N_2$ was bubbled through the reaction mixture for about 5 more minutes, while 0.10 g of 2-propenamide (I) in 5.5 mL of dimethylsulfoxide which had been saturated with $N_2$ for 10 minutes was then added. After about 2 minutes of stirring and $N_2$ bubbling, 0.20 g of 2-propenamide (I) and 4.894 g of 2-methyl-3-oxo-4-oxyhex-1-ene-6-ol (II) in 10.0 mL of dimethylsulfoxide were added. This solution had been saturated with $N_2$ for 10 minutes before addition to the reaction mixture. After about 5 minutes of stirring and bubbling $N_2$ through the reaction mixture, the flask was sealed and placed in a 30° C. bath for 2 days. The mole ratio of monomer I to II in the reaction solution was 1 to 9. The reaction was then terminated by adding 1.0 g of 1% hydroquinone and 100 mL of water thereto. The reaction product was a uniform, homogenous mass which did not dissolve in 100 mL of water that was added to the flask. The reaction product was mixed using a magnetic stirrer. After 9 days, the reaction product was still a uniform, gellotinous mass distinct from the water added when the reaction was terminated. The dilute reaction extract in the 100 mL of wash water was recovered by freeze drying and found to weight 0.12 g and the insoluble organic phase weighed 4.89 g. The fact that the water did not dissolve the sample shows that the product is crosslinked. The product was labeled 19-100-3. Yield was 88.0 weight percent. The aqueous extract of this example had a nitrogen content of 1.21 wt%, and a lignin content of 18.44 weight percent. The insoluble solid of this example had a nitrogen content of 0.64 wt%.

EXAMPLE 7

A total of 0.51 g of lignin and 0.50 g of calcium chloride were placed in a 125 mL erlenmeyer flask containing 12 mL of dimethylsulfoxide. The mixture was stir-bubbled with nitrogen ($N_2$) for about 10 minutes before 0.85 mL of hydrogen peroxide solution (30% by weight), were added to the reaction mixture. After about 2 minutes of stirring and $N_2$ bubbling, 0.30 g of 2-propenamide (I) and 4.89 g of 2-methyl-3-oxo-4- oxyhex-1-ene-6-ol (II) in 15.5 mL of dimethylsulfoxide were added. This solution had been saturated with $N_2$ for 10 minutes before addition to the reaction mixture. After about 5 minutes of stirring and bubbling $N_2$ through the reaction mixture, the flask was sealed and placed in a 30° C. bath for 2 days. The mole ratio of monomer I to II in the reaction solution was 1 to 9. The reaction was then terminated by adding 1.0 g of 1% hydroquinone and 100 mL of water thereto. The reaction product was a uniform, homogenous mass which did not dissolve in 100 mL of water that was added to the flask. The reaction product was mixed using a magnetic stirrer. After 9 days, the reaction product was still a uniform, gellotinous mass distinct from the water added when the reaction was terminated. The dilute reaction extract in the 100 mL of wash water was recovered by freeze drying and found to weigh 0.10 g and the insoluble organic phase weighed 4.02 g. The fact that the water did not dissolve the sample shows that the product is crosslinked. The product was labeled 19-102-1. Yield was 72.2 weight percent. The freeze dried product of this example had a lignin content of 22.47 wt% and a nitrogen content of 1.43 wt%. The insoluble product of this example had a nitrogen content of 0.37 wt%.

Examples 5 to 7 show that water insoluble plastics can be formed by the above described method. When the mole ratio of amide monomer to hydroxyl containing monomer is numerically less than 1 (1/1), the resulting polymer is a plastic which is insoluble in water and other solvents. This unique behavior as a function of monomer ratio in the reaction mixture allows this new compound to be used to make solid objects and articles of manufacture. It also allows these high-lignin-content solids to be used to make gelled (solvent-swollen) networks for application in membranes, immobilizers, and fluid absorbers.

As already noted, the grafted side chain or chains are made of random units of 2-propenamide and 2-methyl-3-oxo-4-oxyhex-1-ene-6-ol. Moreover, the actual content of the grafted side chain or chains depends upon the molar ratio of monomer reactants employed. According to the present invention, it is acceptable to use from about 0.25 molar % to 99 molar % of 2-propenamide to about 99.75 molar % to 0.25 molar % of 2-methyl-3-oxo-4-oxyhex-1-ene-6-ol. However, it is preferable to use a molar % in the range of 5 to 95 or 95 to 5, respectively. The grafted side chain or chains appear to attach at one or more of the 2-, 5- or 6- aromatic ring positions on the oxyphenylpropene moiety. Of course the precise content of the grafted side chain or chains depends upon the contemplated use. For example, in uses where water solubility is required, more of the 2-propenamide monomer should be used. Conversely, where less water solubility and more plastic or elastomer character is desired, more of the 2-methyl-3-oxo-4-oxyhex-1-ene-6-ol monomer should be used.

Although the polymerization reaction of the present invention is a free-radical polymerization, the scope of the present invention clearly extends the concept of gel-state reactions to other types of polymerization reactions such as ionic or step polymerizations.

The soluble or crosslinked lignin graft copolymers of the present invention can also be used advantageously in a conventional manner for the enhanced recovery of oil in subterranean wells. Typically in such processes, the graft copolymer is dispersed or solubilized in injection water, the water may then be injected into the subterranean formation, and the injected water is then moved through the formation acting as a hydraulic ram, thereby pushing the resident oil to a production well. However, the particular chemistry of materials of the present invention makes for a much more economical method of oil production. If the oil is pushed to a production well by an air-aqueous foam, the cost of the pushing agent is much lower and the oil is recovered at much lower cost. The complex polymers of the present invention are particularly suited to forming such a foam, as shown by the following example.

EXAMPLE 8

A glass column, 1.22 meters tall and 2.8 cm in internal diameter, was mounted vertically with a single hole, rubber stopper in the bottom of the column. The single hole of the rubber stopper was sealed with a glass capillary through which nitrogen gas could be introduced to the column. Nitrogen was bubbled into the column at a rate of 21.6 mL of dry gas per second, measured at 24° C. and 1 atmosphere pressure. A 0.26 gram sample of the product of example 2 was introducted into 49.75 g of distilled water and dissolved by rapid stirring. This solution, when introduced into the column apparatus described above made a 7.5 cm high block of fluid above the nitrogen inlet at the bottom of the column. In 60 seconds of bubbling, the fluid had produced stable foam bubbles which had risen up the column to a total height of 39 cm above the surface of the fluid in the column. The column was then cleaned and refilled with water. In 60 seconds of bubbling, the distilled water had produced foam bubbles which had risen up the column to a total height of 2 cm above the surface of the fluid in the column. The addition of 0.52 weight percent copolymer to the water had increased its capacity to form bubbles, useful in foam flooding of an oil-bearing formation, 20 fold. It is noted that the particular amounts and composition of the present lignin graft copolymer effective for such use as well as other particulars of this use would be within the knowledge of one skilled in the art having read the present disclosure.

The molecular weight of the water-soluble lignin copolymers of the present invention are in the range of about 1,000 to about 30,000,000 as determined by size exclusion chromatography using known techniques. Under the process conditions of the present invention already described, it is possible to obtain molecular weights of about 40,000 to 300,000. Under these conditions, the polymer molecular weight is generally increased by increasing the ratio of moles of monomer to moles of hydroperoxide. The converse is true when diminishing the molecular weight.

In general, the reaction occurs at room temperature without adding heat. Reaction times are somewhat variable and on the order of from 1 to about 48 hours with reaction yields as high as 80 weight percent possible in about 1 hour. The preferred reaction time in a commercial or continuous process of manufacture of the copolymer is 1 to 2 hours. Although the polymerization reaction of the present invention is a free-radical polymerization, the scope of the present invention clearly extends the concept of grafting reactions to other types of polymerization reactions such as ionic or chain polymerizations.

This invention was made with government support under CBT-84-17876/CBT-86-96158 awarded by the National Science Foundation. The government has certain rights in this invention.

Having now fully described this invention, it will be apparent to one of ordinary skill in the art that many changes and modifications can be made thereto without departing from the spirit or scope of the invention as set forth herein.

I claim:

1. A method for recovering oil from subterranean wells which comprises:

a) dispersing a soluble graft-copolymer of lignin-(2-propenamide)-(2-methyl-3-oxo-4-oxyhex-1-ene-6-ol) in injection water to form a mixture;

b) injecting said mixture into the subterranean formation and allowing it form a foam; and c) moving said injection fluid through the formation as a hydraulic ram, thereby pushing the resident oil to a production well.

* * * * *